UNITED STATES PATENT OFFICE.

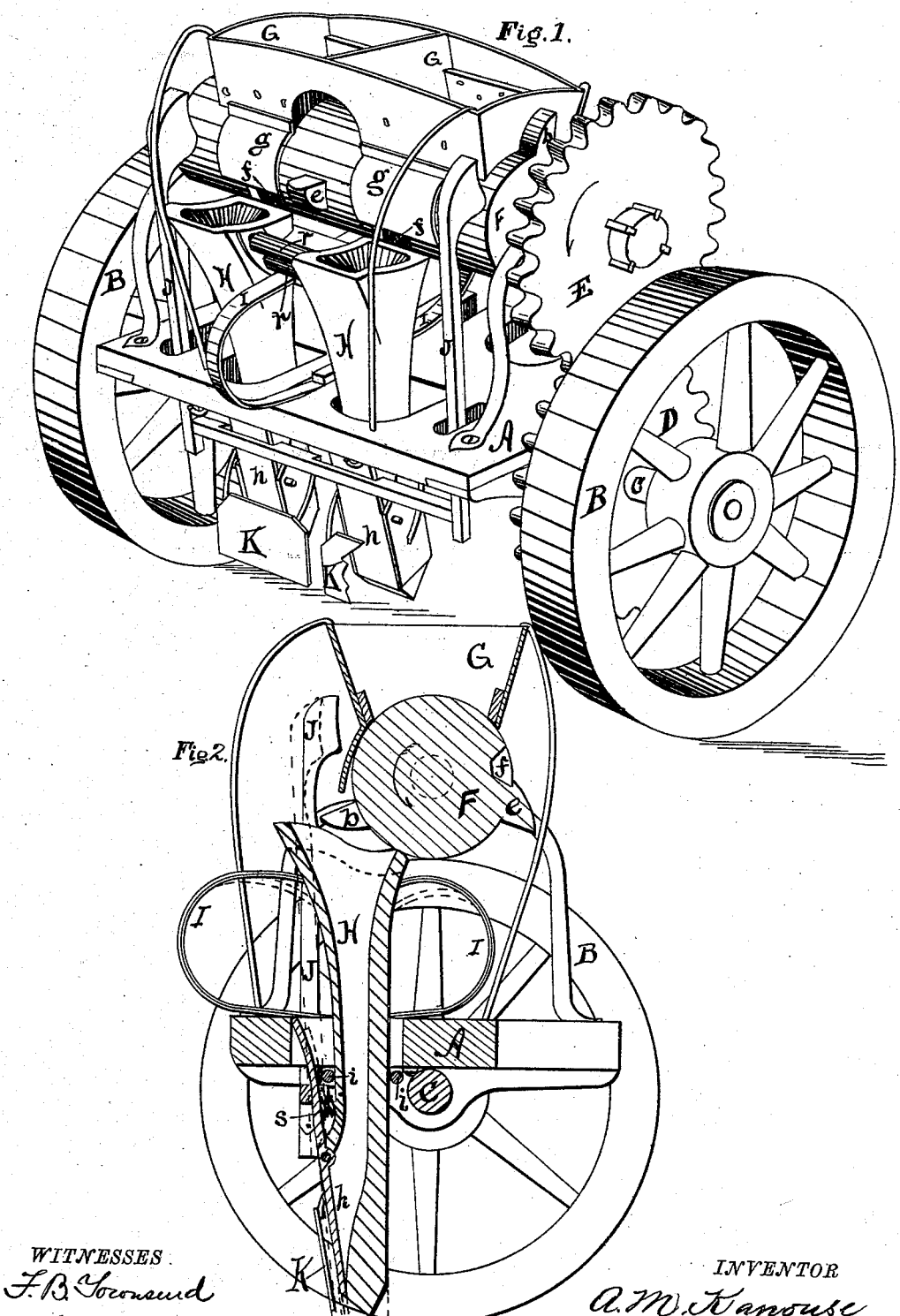

ABRAHAM M. KANOUSE, OF SUN PRAIRIE, WISCONSIN.

IMPROVEMENT IN SEED-PLANTERS.

Specification forming part of Letters Patent No. 168,259, dated September 28, 1875; application filed August 18, 1875.

*To all whom it may concern:*

Be it known that I, ABRAHAM M. KANOUSE, of Sun Prairie, in the county of Dane and State of Wisconsin, have invented a Seed-Planter, of which the following is a specification:

This invention relates to devices for automatically planting corn or other seed at uniform distances; and it consists, first, of planting-stocks which have automatically imparted to them a reciprocation in vertical planes, and provided with automatic valves at their lower ends to hold the grain and deposit it at the moment of greatest depression, combined with a stationary seed-box and seeding devices; second, in a rotating seed-cylinder carrying seed-cups, and the cams required to operate the planting-stocks and valves; third, in covering-hoes attached to, and operated by, the reciprocating stocks.

That others may fully understand my invention, I will particularly describe it, having reference to the accompanying drawing, in which—

Figure 1 is a perspective view of my machine. Fig. 2 is a longitudinal vertical section of the same.

A is the main frame of my machine, supported upon two carrying-wheels, B B, which are mounted upon an axle, C. I prefer that said axle shall be revolving, mounted in boxes attached to said frame A. The wheels B B may be (one or both) coupled to said axle with the ordinary ratchet-and-pawl coupling, and either or both of said wheels will then constitute a driving-wheel, and the regularity of operation of the dropping mechanism will not then be changed if the direction of advance is other than a straight line. The frame A is provided with a suitable tongue for the attachment of a team and a seat for the driver. A gear-wheel, D, is attached to the axle C, if said axle is made to revolve, and, otherwise, to one of the wheels B B, and it gears with and drives the gear-wheel or pinion E upon the axle of the feed-cylinder F, to drive said cylinder. The cylinder F is provided with cells or pockets $f$, and the seed-hoppers G are placed directly above said cylinder, so that, as the pockets $f$ pass under the said hopper, a certain quantity of seed will be received therein, and carried out under the rear edge of the seed-hopper G, to be dropped in its revolution into the planting-stock H. Strips of felt, leather, or other suitable material close the space between the edge of the seed-hopper and the cylinder F, and prevent the crushing or accidental escape of seed. A curtain, $g$, depends from the rear edge of the seed-hopper G, to cover the pockets $f$, and prevent the escape of the seed until the proper moment. The stocks H are tubular, pointed at the lower ends, and provided with valves $h$, which arrest the grain and hold it at the lower end of said stocks until the moment for depositing, when they are opened automatically, and permit it to drop into the place prepared for it by the lower end of the stock. By this means there is no appreciable interval between the discharge of the grain and its delivery in the pit or trench prepared for it, as there would be if the discharge took place at the bottom of the seed-hopper or top of the stock H. The stock H is mounted in the frame A so that it may move freely up and down therein; and to this end I place it between rollers $i\ i$, against which its front and rear sides rest. In every seed-planter two or more of said stocks H are employed, according to the kind of seed to be planted. The several stocks H are all connected together, so as to move up and down simultaneously, and are depressed by the engagement of the cams $e$, which, for convenience, I mount upon the cylinder F, although it may be placed upon the shaft of said cylinder, or in any convenient locality where it will revolve in equal time with said cylinder. The cam $e$ engages with the stock H or the connecting-frame, and forces all of said stocks downward, so that their lower ends penetrate the ground to a depth sufficient for the proper planting of the seed. In the drawings I show the stocks H H connected by a frame-work, and guarded by a series of rollers, $r\ r$, against which the cam $e$ engages with but little friction, though I do not confine myself to that particular mode of construction. The stocks H H are supported upon suitable springs I, which lift them immediately upon being released from the cam $e$; or, if preferred, the motion of the stocks H may be made positive both up and down by substituting a camgroove and a stock-pin for the cam $e$ and spring. The valves $h$ are pivoted to the stock H at the upper edge of the bottom opening, through which the seed is discharged into the pit or trench. The spring S keeps the said valve closed to retain the seed which is dropped into the stock until such moment when it should be discharged, and at the proper moment the upper end of said valve is depressed by means of a lever, J, which is pivoted to the main frame, and rests its lower end against the upper end of the valve $h$, while its upper extremity reaches to the cylinder F, and is actuated to open the valve by engagement with revolving cams $b$ upon the cylinder or the post, which revolves so as to open said slide sufficiently to permit the escape of the seed immediately to the ground. The covering-blades K are attached to the stocks H, and move up and down with them, so that, when said stocks are forced into the ground to deposit the seed, the blade K is also forced into the ground immediately behind it, and, by the elastic reaction of its arms, said blades draw the earth into the pit and cover the seed as the stock rises.

Having described my invention, what I claim as new is—

1. The frame and bearing-wheels of a corn-planter, provided with a stationary seed-box and seed-delivering device, moving in bearings fixed to said frame, combined with one or more tubular stocks, provided with automatic valves at their lower ends, and automatic devices to reciprocate said stocks, thrust them into the ground, and open said valves to deposit the corn.

2. The rotating feed-cylinder, provided with a cam, $e$, combined with the reciprocating stocks H and a retracting-spring, as set forth.

3. The reciprocating seed-stocks H and valves $h$, which are automatically closed by springs S, combined with the tripper-levers J and rotating tappets or cams $b$.

4. Combined with the reciprocating seed-stocks H, the covering-hoes K connected therewith, as set forth.

A. M. KANOUSE.

Witnesses:
H. E. BOARDMAN,
D. M. KANOUSE.